(12) United States Patent
Faulkner et al.

(10) Patent No.: US 11,702,935 B2
(45) Date of Patent: Jul. 18, 2023

(54) PUMPABLE CRIB BAG

(71) Applicant: FCI Holdings Delaware, Inc., Wilmington, DE (US)

(72) Inventors: Dakota Faulkner, Wexford, PA (US); Zachary Stevens, Pittsburgh, PA (US); Richard Wharton, Irvona, PA (US); Dan Pack, Pittsburgh, PA (US)

(73) Assignee: FCI Holdings Delaware, Inc., Wilmington, DE (US)

( * ) Notice: Subject to any disclaimer, the term of this patent is extended or adjusted under 35 U.S.C. 154(b) by 0 days.

(21) Appl. No.: 17/471,501

(22) Filed: Sep. 10, 2021

(65) Prior Publication Data

US 2022/0090501 A1 Mar. 24, 2022

Related U.S. Application Data

(60) Provisional application No. 63/080,141, filed on Sep. 18, 2020.

(51) Int. Cl.
| | |
|---|---|
| *E21D 15/48* | (2006.01) |
| *B29C 65/02* | (2006.01) |
| *B29C 65/00* | (2006.01) |
| *B29C 70/76* | (2006.01) |

(52) U.S. Cl.
CPC ............ *E21D 15/483* (2013.01); *B29C 65/02* (2013.01); *B29C 65/022* (2013.01); *B29C 66/432* (2013.01); *B29C 66/729* (2013.01); *B29C 70/76* (2013.01)

(58) Field of Classification Search
CPC .................................................. E21D 15/483
See application file for complete search history.

(56) References Cited

U.S. PATENT DOCUMENTS

| | | | | |
|---|---|---|---|---|
| 3,383,293 | A | * 5/1968 | Matthews | ................ C25F 1/00 29/527.4 |
| 4,072,015 | A | * 2/1978 | Morrell | ................ E21D 15/483 405/289 |
| 4,983,077 | A |   1/1991 | Sorge et al. | |
| 5,308,196 | A | * 5/1994 | Frederick | .............. E21D 15/483 248/354.2 |
| 5,538,364 | A | * 7/1996 | Huntsman | ............... E21D 15/54 405/303 |
| 6,520,365 | B2 | * 2/2003 | Schneider | ............. D06F 95/002 220/666 |
| 7,654,777 | B2 |   2/2010 | Skarbövig | |
| 9,181,801 | B2 |   11/2015 | Faulkner | |
| 2010/0209023 | A1 |   8/2010 | Skarbövig | |
| 2011/0222970 | A1 |   9/2011 | Skarbövig | |
| 2011/0262231 | A1 |   10/2011 | Hussey et al. | |
| 2012/0009023 | A1 | * 1/2012 | Bower | .................. E21D 15/483 405/266 |
| 2013/0121774 | A1 | * 5/2013 | Slaughter | .............. E21D 15/486 405/288 |

FOREIGN PATENT DOCUMENTS

GB         2083095 A    *  3/1982   ........... A47K 11/045

* cited by examiner

*Primary Examiner* — Janine M Kreck
(74) *Attorney, Agent, or Firm* — The Webb Law Firm

(57) ABSTRACT

A pumpable crib bag may include a body defining a longitudinal axis, at least one reinforcing wire helically extending about the longitudinal axis and along a length of the body, and at least one pocket configured to hold the at least one reinforcing wire therein. The at least one reinforcing wire may include a first material and a second material.

13 Claims, 6 Drawing Sheets

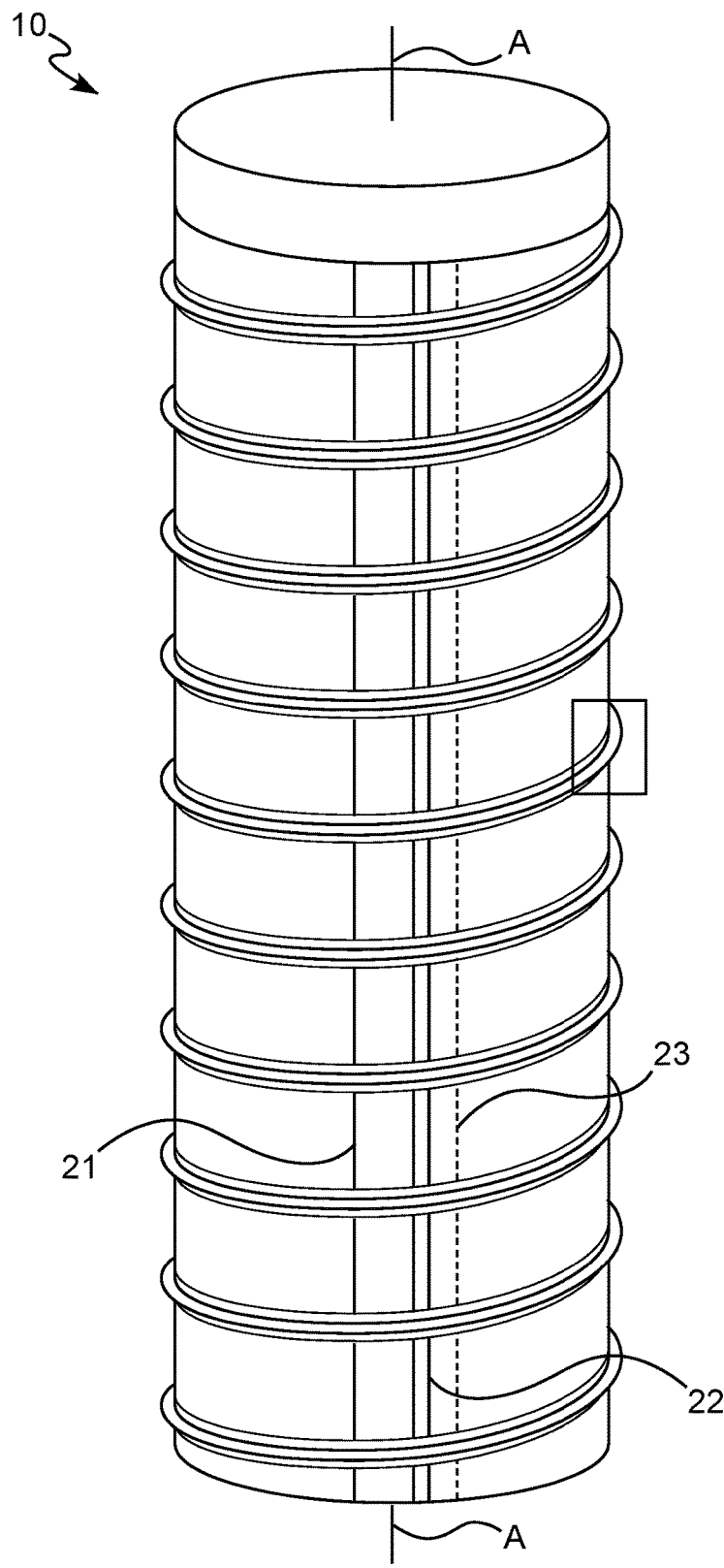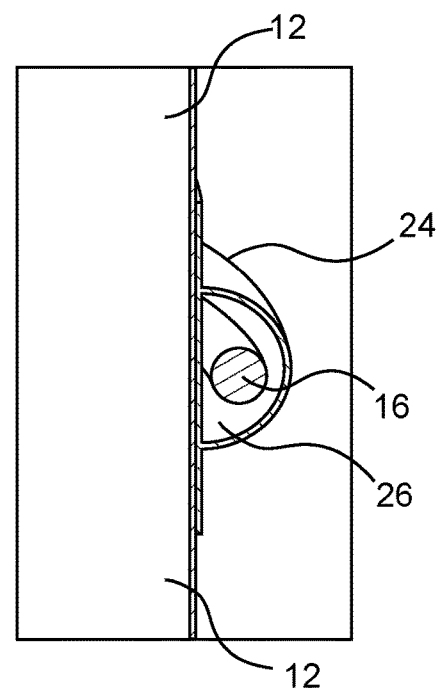
FIG. 4
FIG. 5

PUMPABLE CRIB BAG

CROSS-REFERENCE TO RELATED APPLICATION

This application claims priority to U.S. Provisional Application No. 63/080,141, filed Sep. 18, 2020, which is hereby incorporated by reference in its entirety.

BACKGROUND OF THE INVENTION

Field of the Invention

This disclosure relates generally to a pumpable crib bag for supporting a mine roof.

Description of Related Art

The support of the roof and hanging walls within mines is an important part of the mining process. Depending on the type and quality of rock being supported, the mining depth, and the various forces and stresses present in the mine, support needs can vary. For example, within longwall tailgates and bleeder headings, timber cribs can be used for support. These timber cribs can fail upon an increase in stress from roof convergence or other stresses. Other grout support beams or columns can also be used for support.

Crib bags with a helical support wire are positioned between the roof and floor of the mine opening, with a grout material pumped into the bag to form a support column between the roof and the floor. These crib bags may be constructed from a 5-inch wide piece of fabric that is rolled into a helical spiral, slightly overlapping the previous spiral, which then receives the helical support wire between the two layers of the overlapped fabric. The two layers are then secured together, such as by welding, to create a pocket for the helical support wire.

SUMMARY OF THE INVENTION

According to one non-limiting embodiment of the present disclosure, a pumpable crib bag may include a body defining a longitudinal axis, at least one reinforcing wire helically extending about the longitudinal axis and along a length of the body, and at least one pocket configured to hold the at least one reinforcing wire therein. The at least one reinforcing wire may include a first material and a second material.

The at least one reinforcing wire may include at least one of steel, fiberglass, carbon fiber, rope, and polymer material. The at least one reinforcing wire may include a first reinforcing wire having the first material and a second reinforcing wire having the second material. The at least one pocket may include a first pocket, and the first reinforcing wire and the second reinforcing wire may be held within the first pocket. The at least one pocket may include a first pocket and a second pocket. The first reinforcing wire may be held within the first pocket, and the second reinforcing wire may be held within the second pocket.

The at least one reinforcing wire may include the first material helically extending along a first length of the pumpable crib bag and the second material helically extending along a second length of the pumpable crib bag. The at least one reinforcing wire may include a single wire having the first material and a coating material having the second material covering an outer surface of the single wire. The first material may include steel, and the second material may include nylon. The body may include a continuous piece of fabric with a first edge and a second edge, the first edge being joined to the second edge. The first edge may be joined to the second edge with a vertical weld extending along the longitudinal axis of the body. The at least one pocket may include fabric welded to an outer surface of the body. A void mechanism may be located within the pumpable crib bag and extending along at least a portion of the longitudinal axis. The void mechanism may include at least one of Styrofoam, foam balls, packing peanuts, water beads, and a water-absorbing polymer. The void mechanism may be configured to create a collapsible void after cementitious grout cures within the pumpable crib bag.

According to another non-limiting embodiment of the present disclosure, a pumpable crib bag may include: a body including a fabric having a first edge and a second edge, at least a portion of the first edge overlapping at least a portion of the second edge; a vertical weld joining the overlapping portions of the first edge and the second edge, the vertical weld extending along a first length of the body; at least one reinforcing wire helically extending along a second length of the body; and at least one pocket welded to an outer surface of the body and configured to hold the at least one reinforcing wire therein.

According to another non-limiting embodiment of the present disclosure, a method of manufacturing a pumpable crib bag may include: rolling fabric so that a first edge and a second edge of the fabric overlap to form a body defining a longitudinal axis, welding the overlapping first edge and second edge along the longitudinal axis, welding at least one pocket to the body, and providing at least one reinforcing wire within the welded pocket. The at least one pocket may helically extend along a length of the body, and the at least one reinforcing wire may include a first material and a second material. The at least one reinforcing wire may include at least one of steel, fiberglass, carbon fiber, rope, and polymer material. The at least one reinforcing wire may include a first reinforcing wire having the first material and a second reinforcing wire having the second material. A void mechanism may be provided within the body. The void mechanism may extend along at least a portion of the longitudinal axis.

The present disclosure may be further defined by the following clauses:

Clause 1. A pumpable crib bag comprising: a body defining a longitudinal axis; at least one reinforcing wire helically extending about the longitudinal axis and along a length of the body; and at least one pocket configured to hold the at least one reinforcing wire therein, wherein the at least one reinforcing wire comprises a first material and a second material.

Clause 2. The pumpable crib bag of clause 1, wherein the at least one reinforcing wire comprises at least one of steel, fiberglass, carbon fiber, rope, and polymer material.

Clause 3. The pumpable crib bag of clause 1 or 2, wherein the at least one reinforcing wire comprises a first reinforcing wire having the first material and a second reinforcing wire having the second material.

Clause 4. The pumpable crib bag of any of clauses 1-3, wherein the at least one pocket comprises a first pocket, and wherein the first reinforcing wire and the second reinforcing wire are held within the first pocket.

Clause 5. The pumpable crib bag of any of clauses 1-4, wherein the at least one pocket comprises a first pocket and a second pocket, wherein the first reinforcing wire is held within the first pocket and the second reinforcing wire is held within the second pocket.

Clause 6. The pumpable crib bag of any of clauses 1-5, wherein the at least one reinforcing wire comprises the first material helically extending along a first length of the pumpable crib bag and the second material helically extending along a second length of the pumpable crib bag.

Clause 7. The pumpable crib bag of any of clauses 1-6, wherein the at least one reinforcing wire comprises a single wire having the first material and a coating material having the second material covering an outer surface of the single wire.

Clause 8. The pumpable crib bag of any of clauses 1-7, wherein the first material comprises steel and the second material comprises nylon.

Clause 9. The pumpable crib bag of any of clauses 1-8, wherein the body comprises a continuous piece of fabric with a first edge and a second edge, the first edge being joined to the second edge.

Clause 10. The pumpable crib bag of any of clauses 1-9, wherein the first edge is joined to the second edge with a vertical weld extending along the longitudinal axis of the body.

Clause 11. The pumpable crib bag of any of clauses 1-10, wherein the at least one pocket comprises fabric welded to an outer surface of the body.

Clause 12. The pumpable crib bag of any of clauses 1-11, further comprising a void mechanism located within the pumpable crib bag and extending along at least a portion of the longitudinal axis.

Clause 13. The pumpable crib bag of any of clauses 1-12, wherein the void mechanism comprises at least one of Styrofoam, foam balls, packing peanuts, water beads, water gel, and a water-absorbing polymer.

Clause 14. The pumpable crib bag of any of clauses 1-13, wherein the void mechanism is configured to create a collapsible void after cementitious grout cures within the pumpable crib bag Clause 15. A pumpable crib bag comprising: a body comprising fabric having a first edge and a second edge, at least a portion of the first edge overlapping at least a portion of the second edge; a vertical weld joining the overlapping portions of the first edge and the second edge, the vertical weld extending along a first length of the body; at least one reinforcing wire helically extending along a second length of the body; and at least one pocket welded to an outer surface of the body and configured to hold the at least one reinforcing wire therein.

Clause 16. A method of manufacturing a pumpable crib bag comprising: rolling fabric so that a first edge and a second edge of the fabric overlap to form a body defining a longitudinal axis; welding the overlapping first edge and second edge along the longitudinal axis; welding at least one pocket to the body; and providing at least one reinforcing wire within the welded pocket, wherein the at least one pocket helically extends along a length of the body, and wherein the at least one reinforcing wire comprises a first material and a second material.

Clause 17. The method of clause 16, wherein the at least one reinforcing wire comprises at least one of steel, fiberglass, carbon fiber, rope, and polymer material.

Clause 18. The method of clause 16 or 17, wherein the at least one reinforcing wire comprises a first reinforcing wire having the first material and a second reinforcing wire having the second material.

Clause 19. The method of any of clauses 16-18 further comprising: providing a void mechanism within the body, the void mechanism extending along at least a portion of the longitudinal axis.

BRIEF DESCRIPTION OF THE DRAWINGS

FIG. 4 is a perspective view of a pumpable crib bag according to another embodiment or aspect of the present disclosure;

FIG. 5 is a partial cross-sectional view of the pumpable crib bag of FIG. 4;

DESCRIPTION OF THE DISCLOSURE

Figure 1:
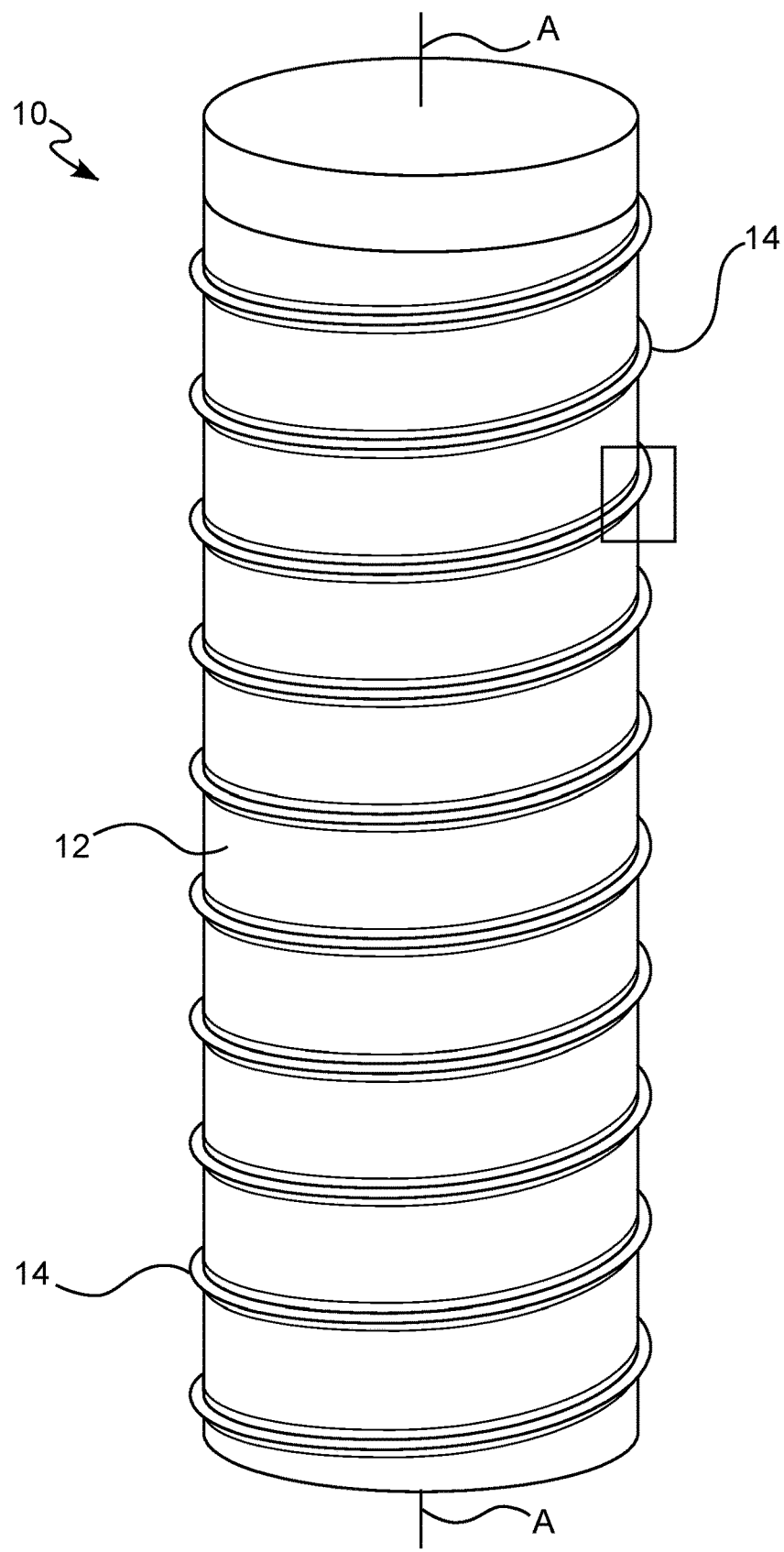
FIG. 1 is a perspective view of a pumpable crib bag according to one embodiment or aspect of the present disclosure.

For purposes of the description hereinafter, the terms "upper", "lower", "right", "left", "vertical", "horizontal", "top", "bottom", "lateral", "longitudinal", and derivatives thereof shall relate to the disclosure as it is oriented in the figures. However, it is to be understood that the disclosure may assume alternative variations and step sequences, except where expressly specified to the contrary. It is also to be understood that the specific pumpable crib bags and processes illustrated in the attached drawings and described in the following specification are simply exemplary aspects of the disclosure. Hence, specific dimensions and other physical characteristics related to the aspects disclosed herein are not to be considered as limiting.

The present disclosure is directed to, in general, a pumpable crib bag. Certain aspects of the components of each are illustrated in FIGS. 1-7.

With reference to FIGS. 1, 3, 4, 6, and 7, pumpable crib bags 10 according to the present disclosure are shown. While each crib bag 10 has different features, each crib bag 10 is pumpable. In other words, each bag 10 is configured to have cementitious grout (not shown) or other curable materials pumped within a body 12 of the pumpable crib bag 10. In one example, cementitious grout can be mixed with water in order to form cement within the pumpable crib bag 10. Once fully hardened, the cement can be used to support a roof 2 of an underground opening. In another example, two materials can be pumped into the pumpable crib bag 10, causing a reaction that leads to a hardened material being formed therein. The first material can be a non-combustible grey powder that forms an easy-to-pump slurry when mixed with water. The second material can be a non-combustible low-viscosity easy-to-pump liquid accelerator. Both examples produce a pumpable crib bag 10 that serves as a load-bearing mine roof support. The pumpable crib bag 10 according to the present disclosure is to be applied between the roof 2 and a floor 4 of the underground opening in order to provide support to the roof 2. A pumpable crib bag 10 according to one aspect of the present invention may maintain a stable deformation of approximately 20 inches, whereas a conventional pumpable crib bag only maintains a stable load through 10 inches of deformation.

Referring now to FIG. 1, a first embodiment of the deformable pumpable crib bag 10 is shown. The pumpable crib bag 10 includes the body 12 that extends along the length of the pumpable crib bag 10. As shown, the body 12 is substantially cylindrical in shape, although other suitable shapes may be utilized. The amount of load the pumpable crib bag 10 can support may be dependent upon the diameter of the body 12. The cylindrical body 12 defines a longitudinal axis A. The body 12 can be made of fabric, plastic, and/or fabric-reinforced plastic. This material is resilient and strong enough to hold the cementitious grout, cement, and other curable materials therein while being applied to a roof 2. The material is capable of generally holding its cylindrical form under pressure applied from the roof 2. As will be described in more detail below, other features of the pumpable crib bag 10 are intended to help the body 12 support a mine roof 2. It is contemplated that other resilient materials or fabrics known to those having ordinary skill in the art may also be used as long as these fabrics can contain the cementitious grout or other curable material therein during use. The fabric of the body 12 must also be resilient enough to withstand deformation due to convergence.

Figure 2A:
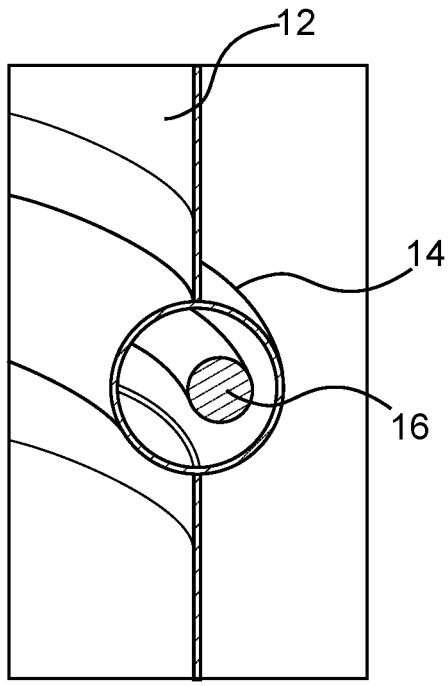
FIG. 2A is a partial cross-sectional view of the pumpable crib bag of FIG. 1 according to one embodiment or aspect of the present disclosure.
Figure 2B:
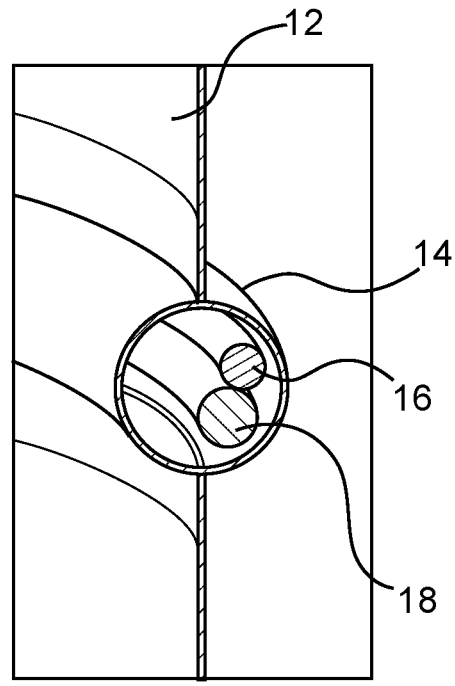
FIG. 2B is a partial cross-sectional view of the pumpable crib bag of FIG. 1 according to another embodiment or aspect of the present disclosure.
Figure 2C:
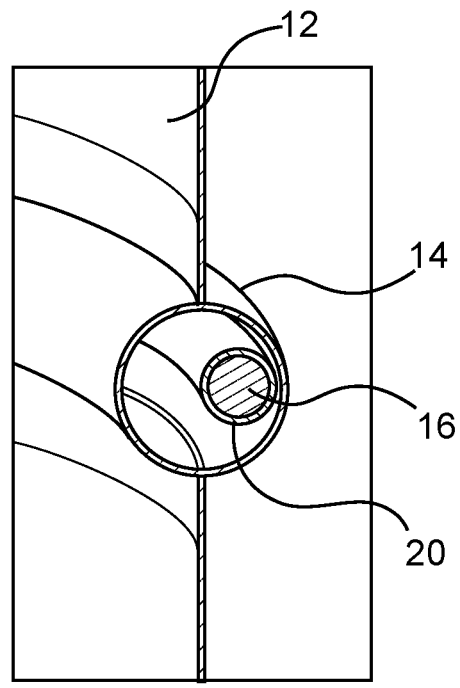
FIG. 2C is a partial cross-sectional view of the pumpable crib bag of FIG. 1 according to another embodiment or aspect of the present disclosure.

A pocket 14 extends around and along an outer surface of the body 12. As shown in FIGS. 2A-2C and 5, the pocket 14 is configured to hold a first reinforcing wire 16 and other supporting materials therein. The pocket 14 can be integral with the body 12, or the pocket 14 can be attached to the body 12 by methods known to those having ordinary skill in the art. In either instance, the pocket 14 can be made out of the same or different material as the body 12. As shown in FIGS. 2A-2C, the pocket 14 is integral with the body 12. As shown in FIG. 1, the pocket 14 helically extends along the length of the body 12 in the direction of the longitudinal axis A. Although shown in a helical shape, the pocket 14 can traverse about the body 12 in other ways. Multiple pockets 14 can encircle the body 12 at various points about the length of the body 12, and in some instances with multiple pockets 14, the pockets 14 can be connected vertically via other materials or other pockets.

Referring now to FIGS. 2A-2C, the materials within the pocket 14 are shown. In FIG. 2A, a first reinforcing wire 16 is disposed within the space of the pocket 14. The first reinforcing wire 16 extends along the entire length of the pocket 14 such that the first reinforcing wire 16 helically extends about the body 12 like the pocket 14. The first reinforcing wire 16 helps maintain the shape of the body 12 when the body is under stress from the roof 2. The first reinforcing wire 16 can be made of materials such as solid steel, multi-strand steel, fiberglass, carbon fiber, rope, polymers, composites, and combinations of these materials or other materials known to those having skill in the art. As shown in FIG. 2B, a second reinforcing wire 18 is also disposed within the space of the pocket 14. The second reinforcing wire 18 can also extend along the entire length of the pocket 14, helically extending about the body 12. The second reinforcing wire 18 can be made of the same or different material as the first reinforcing wire 16. In instances where the material is different, the material of the second reinforcing wire 18 can also be chosen from the list of materials discussed above in connection with the first reinforcing wire 16.

In one aspect or embodiment, the first reinforcing wire 16 is formed from a stronger material than the material utilized for the second reinforcing wire 18, with the material of the second reinforcing wire 18 being more ductile than the material of the first reinforcing wire 16 to increase the ability of the pumpable crib bag 10 to deform under loading after installation while maintaining stability and confinement. Differing from the example shown in FIG. 2B, two wires may again occupy the pocket 14; however, the two wires occupy different portions of the pocket 14 so that there is minimal overlap. The two reinforcing wires may each occupy a different portion of the pocket 14, so that any single location within a pocket appears the same as the embodiment shown in FIG. 2A. In a similar manner, the first reinforcing wire 16 may be made out of two different materials connected, welded, or otherwise joined together, so that the reinforcing wire 16 transitions from one material to another as it extends along the length of the body 12 and pocket 14.

As shown in FIG. 2C, the first reinforcing wire 16 may again occupy the pocket 14; however, the first reinforcing wire 16 has a coating 20 applied to an outside surface of the first reinforcing wire 16. The coating 20 on the reinforcing wire 16 is configured to control the overall support performance of the pumpable crib bag 10. In one aspect or embodiment, the first reinforcing wire 16 is formed from a stronger material than the material utilized for the coating 20, with the material of the coating 20 being more ductile than the material of the first reinforcing wire 16 to increase the ability of the pumpable crib bag 10 to deform under loading after installation while maintaining stability and confinement. For example, the reinforcing wire 16 may be a steel wire and the coating 20 may be a nylon rope cover, the reinforcing wire 16 may be a steel braided wire and the coating 20 may be plastic, or the reinforcing wire 16 may be steel and the coating 20 may be grease.

Figure 3:
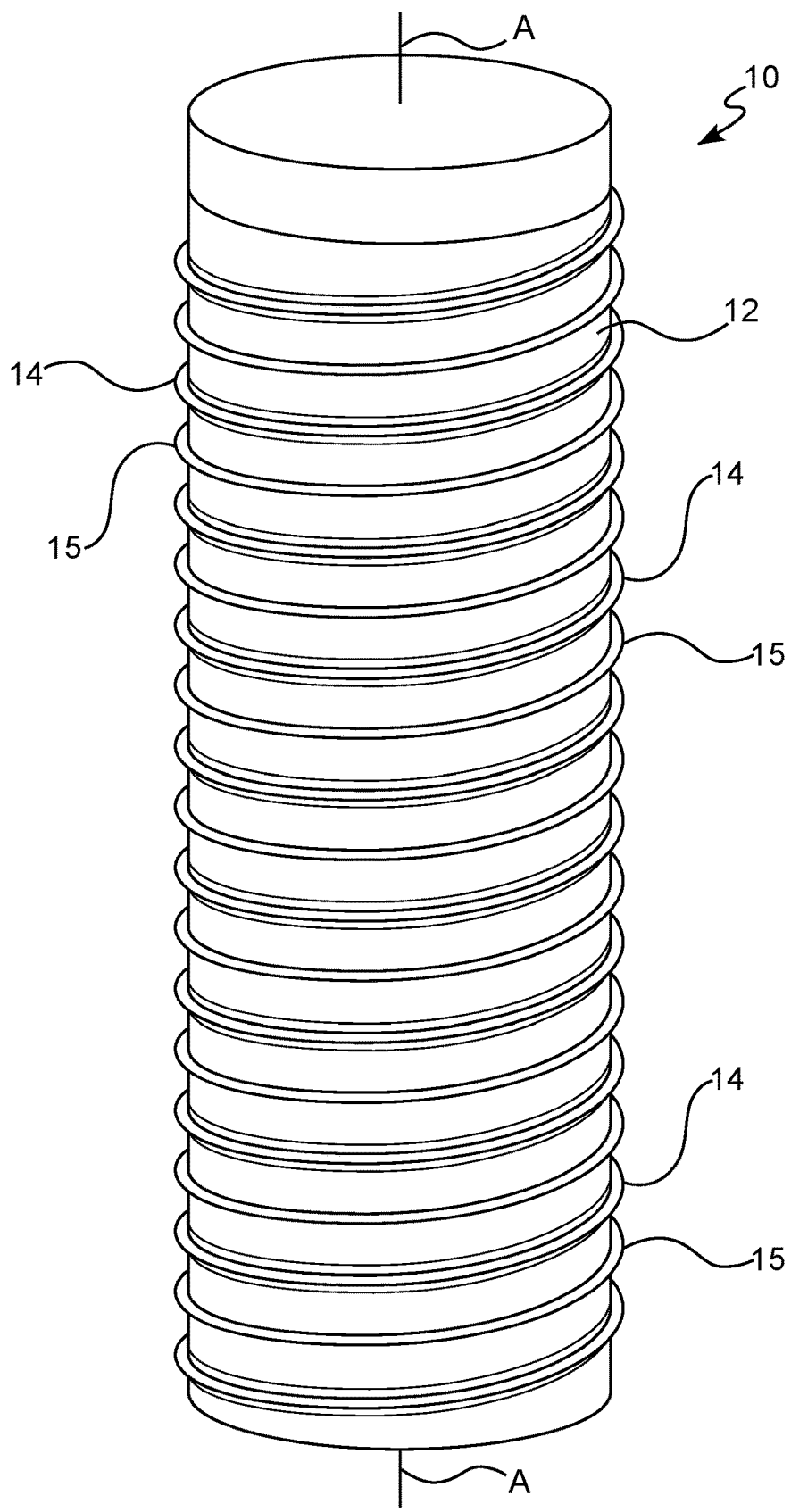
FIG. 3 is a perspective view of a pumpable crib bag according to another embodiment or aspect of the present disclosure.

In another embodiment of the pumpable crib bag 10, shown in FIG. 3, the body 12 has a first pocket 14 and a second pocket 15. The pockets 14, 15 helically extend along the length of the body 12. The pockets 14, 15 are spaced from each other and do not overlap at any point. The pockets 14, 15 may be made as described above in connection with pocket 14. Each pocket 14, 15 also has one or more reinforcing wires (not shown) disposed therein to provide support to the pumpable crib bag 10. The reinforcing wires within the pockets 14, 15 may be made of the same materials and in the same manner as the reinforcing wires 16, 18 discussed above.

Referring now to FIGS. 4 and 5, a third embodiment of a pumpable crib bag 10 is shown. The body 12 of this pumpable crib bag 10 is made of a rolled fabric. The fabric is again selected from one of the materials described above. The fabric has a first edge 21 and a second edge 23 that overlap and form the cylindrical shape of the body 12. A vertical weld 22 is then applied to the overlapping edges 21, 23 in a direction extending along the longitudinal axis A in order to permanently shape the body 12 into the cylindrical form shown. Full-strength welds along the fabric of the body 12 affect the mechanical properties of the fabric of the body 12, such as the ability of the fabric to stretch. The vertical weld 22 of the pumpable crib bag 10 shown in FIGS. 4 and 5 minimizes the surface area of full-strength welding applied to the body 12 and, therefore, reduces the effect of any change in mechanical properties of the fabric of the body 12 caused by the welding. In other words, the vertical weld 22 minimizes the amount of fabric affected by the welding process. As discussed above, conventional pumpable crib bags are constructed by rolling a 5-inch wide piece of fabric in a helical spiral with slightly overlapping edges, inserting a wire between the overlapping edges, and welding above and below the wire to create a pocket. In contrast, providing a single full-strength vertical weld 22 that extends in a direction along the longitudinal axis A allows the body 12 to fully stretch radially outward around the full circumference of the body 12 during deformation of the installed pumpable crib bag 10.

A pocket material 24 is attached to the outer surface of the body 12. The pocket material 24 and the outer surface of the body 12 define a pocket 26 therebetween. Like the pocket 14 described above, the pocket 26 is configured to receive a wire 16 or wires 16, 18 therein. The pocket material 24 may be welded to the body 12, although other attachment methods known to those having skill in the art may be used. In one aspect or embodiment, the pocket material 24 is welded to the body 12 utilizing a lower-strength welding process compared to the welding process for the vertical weld 22 such that the welding of the pocket material 24 to the body 12 does not affect the mechanical properties of the material of the body 12 as much as does the welding process for the vertical weld 22.

Figure 6:
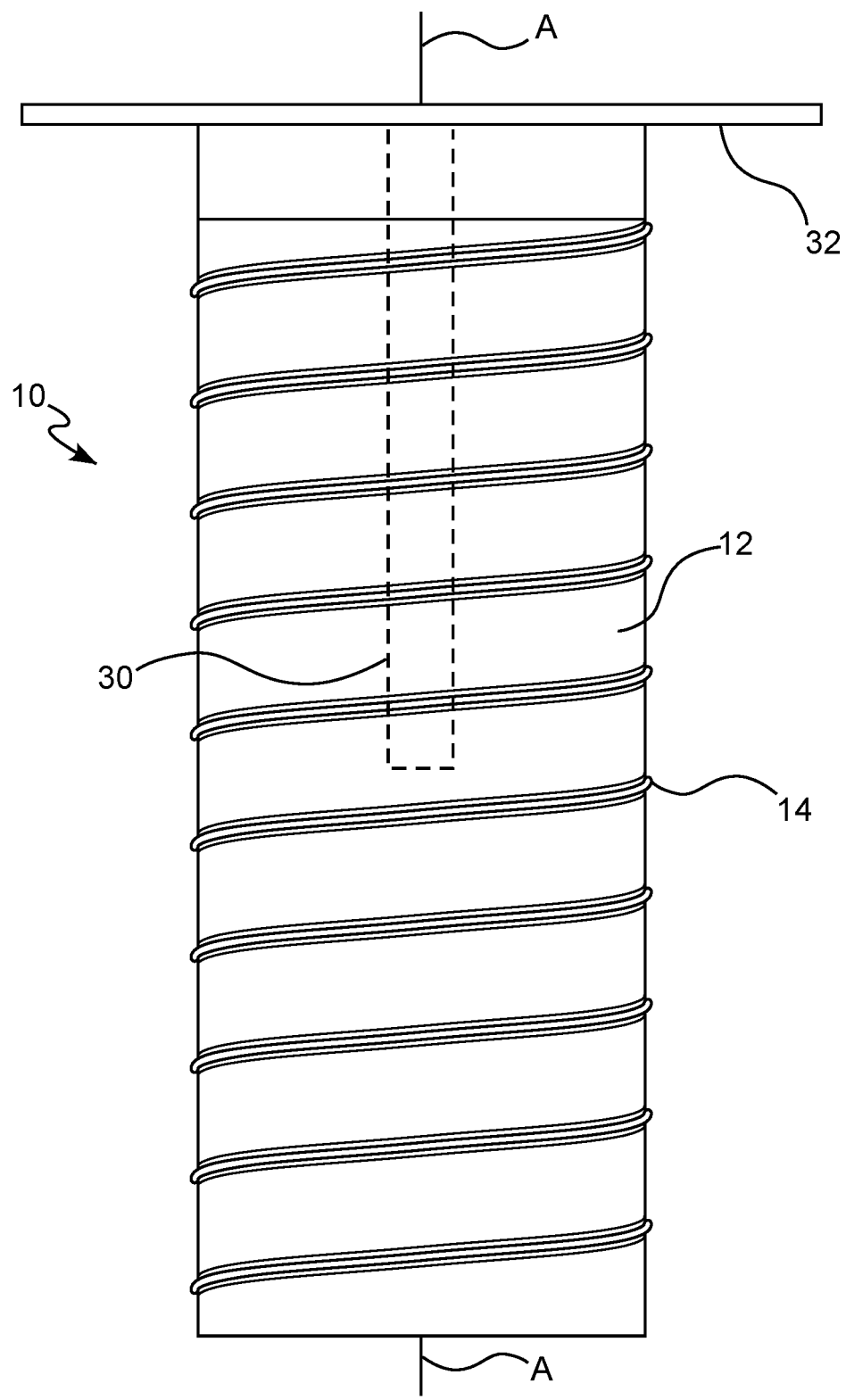
FIG. 6 is a front view of the pumpable crib bag of FIG. 1 having a void mechanism extending therein.
Figure 7:
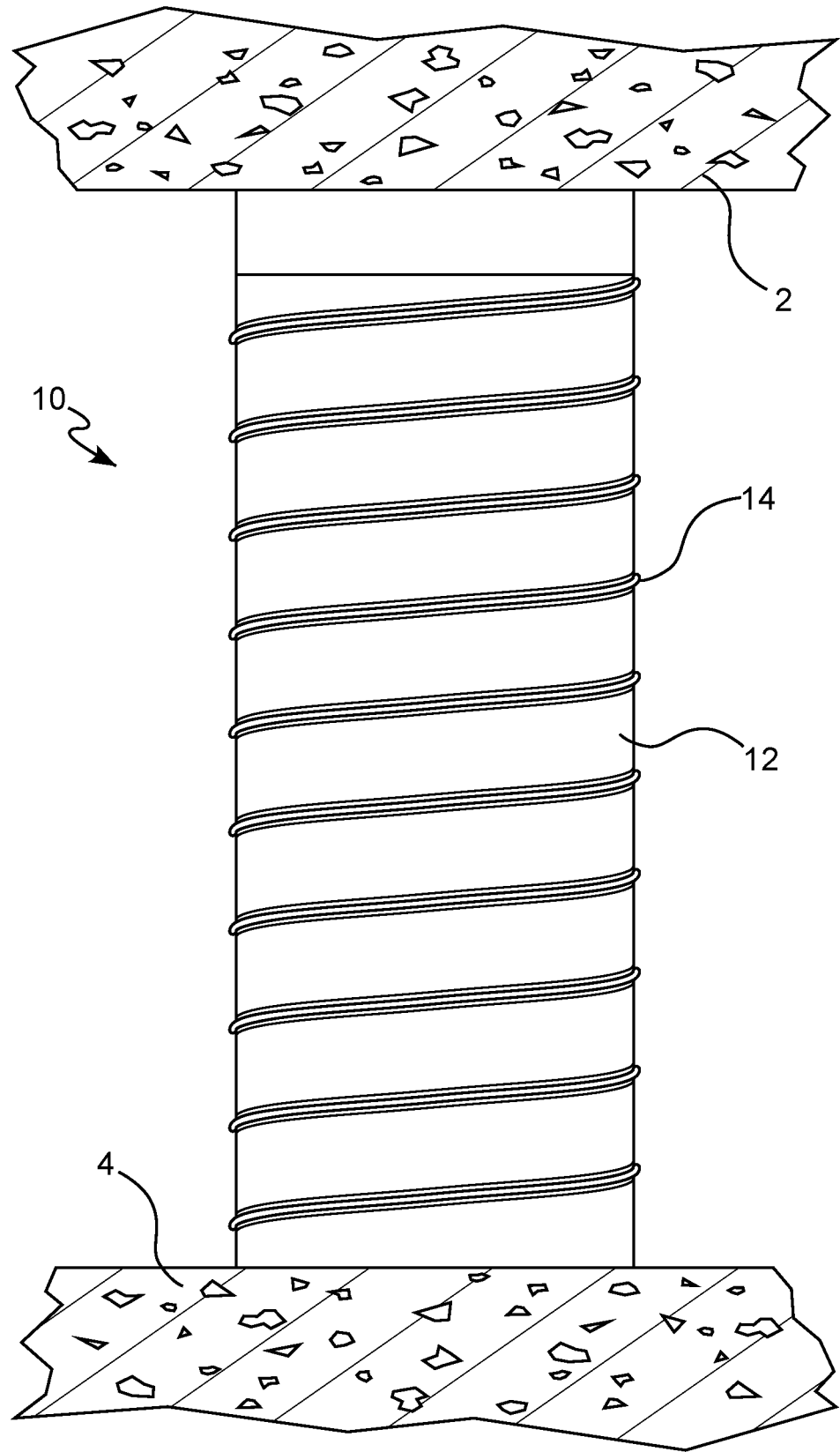
FIG. 7 is a front view of the pumpable crib bag of FIG. 1 as applied within an underground opening.

Referring to FIG. 6, a pumpable crib bag 10 having a void mechanism 30 is shown. The void mechanism 30 takes up space within the pumpable crib bag 10, so that the cementitious grout or curable materials can harden or cure around the void mechanism within the body 12 of the pumpable crib bag 10. The void is designed to take up a specific volume of space within the pumpable crib bag 10 so that, upon bearing a load from the mine roof 2, the material within the pumpable crib bag 10 can collapse within the void to reduce the amount of stress experienced by the body 12 and reinforcing wire(s) 16, 18, allowing the pumpable crib bag 10 to support a larger amount of force from the mine roof 2. As shown, the void mechanism 30 takes the form of a metallic cylinder extending along the longitudinal axis A of the pumpable crib bag 10. The void mechanism 30 extends from a top portion 32 and partially into the pumpable crib bag 10.

Other void mechanisms 30 are also contemplated. Styrofoam parts, shapes, or other types of compressible material, such as foam balls or packing peanuts, can be placed with the body 12 of the pumpable crib bag 10. The material within the pumpable crib bag 10 can then be pumped in around the inserted compressible materials. Water beads, water gel, or other water-absorbing polymers can be used. The water-absorbing polymers remove water from the curing material pumped into the pumpable crib bag 10, leaving small voids throughout. A foaming agent that incorporates air bubbles into the curing material can also be used. In each of these instances, the void mechanism is left within the pumpable crib bag 10 as the curable material hardens. However, each of these void mechanisms 30 still provide for the cured material to compress within the body 12 of the pumpable crib bag 10 during use. Styrofoam and packing peanuts are made of a compressible material. The removal of water from the curing materials and the addition of air bubbles both create small bubbles/voids throughout the cured material that can then collapse under stress, serving the same purpose as the void mechanism 30.

While various aspects of the deformable pumpable crib bag 10 were provided in the foregoing description, those skilled in the art may make modifications and alterations to these aspects without departing from the scope and spirit of the invention. For example, it is to be understood that this disclosure contemplates that, to the extent possible, one or more features of any aspect can be combined with one or more features of any other aspect. Accordingly, the foregoing description is intended to be illustrative rather than restrictive. The invention described hereinabove is defined by the appended claims, and all changes to the invention that fall within the meaning and the range of equivalency of the claims are to be embraced within their scope.

The invention claimed is:

1. A pumpable crib bag comprising:
a body defining a longitudinal axis;
at least one reinforcing wire helically extending about the longitudinal axis and along a length of the body;
a void mechanism located within the pumpable crib bag and extending along at least a portion of the longitudinal axis and the void mechanism comprises at least one of Styrofoam, foam balls, packing peanuts, water beads, water gel, and a water-absorbing polymer; and
at least one pocket configured to hold the at least one reinforcing wire therein,
wherein the at least one reinforcing wire comprises a first material and a second material.

2. The pumpable crib bag of claim 1, wherein the at least one reinforcing wire comprises at least one of steel, fiberglass, carbon fiber, rope, and polymer material.

3. The pumpable crib bag of claim 1, wherein the at least one reinforcing wire comprises a first reinforcing wire having the first material and a second reinforcing wire having the second material.

4. The pumpable crib bag of claim 3, wherein the at least one pocket comprises a first pocket, and wherein the first reinforcing wire and the second reinforcing wire are held within the first pocket.

5. The pumpable crib bag of claim 3, wherein the at least one pocket comprises a first pocket and a second pocket, wherein the first reinforcing wire is held within the first pocket and the second reinforcing wire is held within the second pocket.

6. The pumpable crib bag of claim 1, wherein the at least one reinforcing wire comprises the first material helically extending along a first length of the pumpable crib bag and the second material helically extending along a second length of the pumpable crib bag.

7. The pumpable crib bag of claim 1, wherein the at least one reinforcing wire comprises a single wire having the first material and a coating material having the second material covering an outer surface of the single wire.

8. The pumpable crib bag of claim 7, wherein the first material comprises steel and the second material comprises nylon.

9. The pumpable crib bag of claim 1, wherein the body comprises a continuous piece of fabric with a first edge and a second edge, the first edge being joined to the second edge.

10. The pumpable crib bag of claim 9, wherein the first edge is joined to the second edge with a vertical weld extending along the longitudinal axis of the body.

11. The pumpable crib bag of claim 9, wherein the at least one pocket comprises fabric welded to an outer surface of the body.

12. The pumpable crib bag of claim 1, wherein the void mechanism is configured to create a collapsible void after cementitious grout cures within the pumpable crib bag.

13. A pumpable crib bag comprising:
a body defining a longitudinal axis;
a first reinforcing wire and a second reinforcing wire each helically extending about the longitudinal axis and along a length of the body; and
a pocket receiving the first reinforcing wire and the second reinforcing wire therein, wherein the first reinforcing wire comprises a first material and the second reinforcing wire comprises a second material.

\* \* \* \* \*